(12) United States Patent
Zhao et al.

(10) Patent No.: US 11,249,990 B2
(45) Date of Patent: Feb. 15, 2022

(54) DATABASE MANAGEMENT METHOD AND SYSTEM, AND ELECTRONIC DEVICE

(71) Applicant: BEIJING OCEANBASE TECHNOLOGY CO., LTD., Beijing (CN)

(72) Inventors: Yuzhong Zhao, Zhejiang (CN); Xiao Chen, Zhejiang (CN)

(73) Assignee: BEIJING OCEANBASE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/243,381

(22) Filed: Apr. 28, 2021

(65) Prior Publication Data

US 2021/0248133 A1    Aug. 12, 2021

Related U.S. Application Data (63) Continuation of application No. PCT/CN2020/075018, filed on Feb. 13, 2020.

(30) Foreign Application Priority Data

Mar. 26, 2019    (CN) .......................... 201910230145.3

(51) Int. Cl.
  *G06F 16/242*    (2019.01)
  *G06F 16/22*    (2019.01)
  *H04L 9/08*    (2006.01)

(52) U.S. Cl.
  CPC .......... *G06F 16/244* (2019.01); *G06F 16/221* (2019.01); *G06F 16/2246* (2019.01); *G06F 16/2282* (2019.01); *H04L 9/0819* (2013.01)

(58) Field of Classification Search
  CPC ............. G06F 16/2246; G06F 12/0802; G06F 16/134; G06F 16/86
  USPC ......................................................... 707/737
  See application file for complete search history.

(56) References Cited

U.S. PATENT DOCUMENTS

| | | | |
|---|---|---|---|
| 2014/0188870 A1 | 7/2014 | Borthakur et al. | |
| 2015/0134678 A1* | 5/2015 | Hu .......................... | G06F 16/22 707/756 |
| 2018/0300350 A1 | 10/2018 | Mainali et al. | |
| 2019/0236156 A1* | 8/2019 | Fanghaenel ......... | G06F 16/2246 |

FOREIGN PATENT DOCUMENTS

| | | |
|---|---|---|
| CN | 105138622 A | 12/2015 |
| CN | 105159915 A | 12/2015 |
| CN | 105447059 A | 3/2016 |
| CN | 105989129 A | 10/2016 |
| CN | 106598494 A | 4/2017 |

(Continued)

*Primary Examiner* — Hung T Vy
(74) *Attorney, Agent, or Firm* — Seed IP Law Group LLP (57) ABSTRACT

One or more implementations of the present specification disclose a database analysis information generation method, including: reading data in a to-be-merged data level and data in a merging data level; generating a new merging data level by merging the data in the to-be-merged data level and the data in the merging data level in a merging process; and performing an operation of generating new database analysis information based on data in the new merging data level and data in existing database analysis information in the process of generating the new merging data level.

20 Claims, 2 Drawing Sheets

(56) References Cited

FOREIGN PATENT DOCUMENTS

| CN | 108090106 A | 5/2018 |
| CN | 108900619 A | 11/2018 |
| CN | 109165201 A | 1/2019 |
| CN | 110032565 A | 7/2019 |

* cited by examiner

DATABASE MANAGEMENT METHOD AND SYSTEM, AND ELECTRONIC DEVICE

BACKGROUND

Technical Field

Implementations of the present specification relate to the database field, and in particular, to a database management method and system, and an electronic device.

Description of the Related Art

A database can be simply considered as an electronic file cabinet, i.e., a place for storing electronic files. Users can add data to the files, or truncate, update, or delete data in the files, etc.

An optimizer is configured in the database, and the optimizer in the database selects an optimal execution plan by using a cost model. However, calculation of the cost model needs to depend on database analysis information such as the number of rows, the number of different values in a column, a maximum value in the column, and a minimum value in the column, and it is very resource-consuming to generate the database analysis information.

In existing solutions, generating database analysis information in a database is independent and is triggered by an SQL command or a timing task, or is triggered when an update amount of a relational table exceeds a specified threshold, and then the database analysis information is generated. In addition, in the existing processes of generating database analysis information, all data in the database usually needs to be traversed or sampled once.

BRIEF SUMMARY

The present specification provides a database management method and system, and an electronic device.

Technical solutions of one or more implementations of the present specification are implemented in the following way:

Some implementations of the present specification provide a database analysis information generation method, including: reading data in a to-be-merged data level and data in a merging data level; generating a new merging data level by merging the data in the to-be-merged data level and the data in the merging data level in a merging process; and performing an operation of generating new database analysis information based on data in the new merging data level and data in existing database analysis information in the process of generating the new merging data level.

According to the database analysis information generation method provided in this implementation of the present specification, the step of merging the data in the to-be-merged data level and the data in the merging data level to generate the new merging data level in the merging process includes: comparing a primary key value in the to-be-merged data level with a primary key value in the merging data level; and merging the data in the to-be-merged data level and the data in the merging data level based on a result of the comparing to generate the new merging data level in the merging process.

According to the database analysis information generation method provided in this implementation of the present specification, the merging the data in the to-be-merged data level and the data in the merging data level based on the result of the comparing to generate the new merging data level in the merging process includes: when a primary key value in the to-be-merged data level is the same as a primary key value in the merging data level, reading a row of data corresponding to the primary key value in the to-be-merged data level, and updating a row of data in the merging data level that corresponds to the primary key value in the merging data level based on the row of data corresponding to the primary key value in the to-be-merged data level; and using the primary key value in the merging data level and a row of updated data corresponding to the primary key value in the merging data level as a primary key value in the new merging data level and a row of data corresponding to the primary key value in the new merging data level, where when the row of data corresponding to the primary key value in the merging data level is updated, the primary key value in the new merging data level that is the same as the primary key value in the merging data level and the row of data corresponding to the primary key value in the new merging data level are generated in the new merging data level.

According to the database analysis information generation method provided in this implementation of the present specification, the merging the data in the to-be-merged data level and the data in the merging data level based on the result of the comparing to generate the new merging data level in the merging process further includes: when a primary key value in the to-be-merged data level is different from a primary key value in the merging data level, reading a row of data corresponding to the primary key value in the to-be-merged data level, and adding, to the merging data level, the primary key value in the to-be-merged data level and the row of data corresponding to the primary key value in the to-be-merged data level; and using, as a new primary key value and a row of data corresponding to the new primary key value in the new merging data level, the primary key value and the corresponding row of data that are added to the merging data level, where when the primary key value and the corresponding row of data in the to-be-merged data level are added to the merging data level, a primary key value that is the same as the added primary key value in the merging data level and a corresponding row of data are generated in the new merging data level.

The database analysis information generation method provided in this implementation of the present specification includes: when a number of columns in the row of data corresponding to the primary key value in the to-be-merged data level is greater than a number of columns in the row of data corresponding to the same primary key value in the merging data level, adding, to the row of data corresponding to the primary key value in the merging data level, a column in the row of data corresponding to the primary key value in the to-be-merged data level that is different from the columns in the row of data corresponding to the same primary key value in the merging data level and data corresponding to the added columns.

According to the database analysis information generation method provided in this implementation of the present specification, the merging the data in the to-be-merged data level and the data in the merging data level based on the result of the comparing to generate the new merging data level in the merging process further includes: when the merging data level includes a primary key value that is different from a primary key value in the to-be-merged data level, adding, to the new merging data level, the primary key value in the merging data level that is different from the primary key value in the to-be-merged data level and a row of data corresponding to the primary key value in the merging data level that is different from the primary key value in the to-be-merged data level.

The database analysis information generation method provided in this implementation of the present specification includes: when database analysis information is generated for the first time, obtaining the database analysis information based on data in the merging data level that is generated for the first time, where data in the existing database analysis information is empty, and the data in the merging data level generated for the first time is directly obtained by using the data in the to-be-merged data level.

According to the database analysis information generation method provided in this implementation of the present specification, the database analysis information generated for the first time, the existing database analysis information, and the new database analysis information each include information on a number of rows, a column, a minimum value in a column, a maximum value in a column, and a number of different values in a column.

According to the database analysis information generation method provided in this implementation of the present specification, the performing the operation of generating the new database analysis information based on the data in the new merging data level and the data in the existing database analysis information in the process of generating the new merging data level includes: using the number of primary key values in the new merging data level as the number of rows in the new database analysis information based on a change of the number of primary key values in the new merging data level.

According to the database analysis information generation method provided in this implementation of the present specification, the performing the operation of generating the new database analysis information based on the data in the new merging data level and the data in the existing database analysis information in the process of generating the new merging data level further includes: using columns in a row of data that includes the greatest number of columns among all rows of data in the new merging data level as columns in the new database analysis information.

According to the database analysis information generation method provided in this implementation of the present specification, the performing the operation of generating the new database analysis information based on the data in the new merging data level and the data in the existing database analysis information in the process of generating the new merging data level further includes: each time a primary key value and a corresponding row of data are generated in the new merging data level, comparing a minimum value in a column in the new merging data level with a minimum value corresponding to the column in the existing database analysis information, and when the minimum value in the column in the new merging data level is smaller than the minimum value corresponding to the column in the existing database analysis information, selecting the minimum value in the column in the new merging data level as a minimum value corresponding to the column in the new database analysis information; or otherwise, selecting the minimum value corresponding to the column in the existing database analysis information as a minimum value corresponding to the column in the new database analysis information.

According to the database analysis information generation method provided in this implementation of the present specification, the performing the operation of generating the new database analysis information based on the data in the new merging data level and the data in the existing database analysis information in the process of generating the new merging data level further includes: each time a primary key value and a corresponding row of data are generated in the new merging data level, comparing a maximum value in a column in the new merging data level with a maximum value corresponding to the column in the existing database analysis information, and when the maximum value in the column in the new merging data level is greater than the maximum value corresponding to the column in the existing database analysis information, selecting the maximum value in the column in the new merging data level as a maximum value corresponding to the column in the new database analysis information; or otherwise, selecting the maximum value corresponding to the column in the existing database analysis information as a maximum value corresponding to the column in the new database analysis information.

According to the database analysis information generation method provided in this implementation of the present specification, the performing the operation of generating the new database analysis information based on the data in the new merging data level and the data in the existing database analysis information in the process of generating the new merging data level further includes: each time a primary key value and a corresponding row of data are generated in the new merging data level, using a HyperLogLog algorithm to obtain a number of different values in a column in the new merging data level; and using the number of different values in the column in the new merging data level as a number of different values in the column in the new database analysis information.

Before the step of generating the new merging data level, the database analysis information generation method provided in this implementation of the present specification further includes: presetting a data merging threshold for the to-be-merged data level, and when an amount of memory occupied by the data in the to-be-merged data level is greater than the data merging threshold, merging the data in the to-be-merged data level and the data in the merging data level.

Some implementations of the present specification provides a database analysis information generation system, including: a reading module, configured to read data in a to-be-merged data level and data in a merging data level; a new merging data level generation module, configured to generate a new merging data level by merging the data in the to-be-merged data level and the data in the merging data level in a merging process; and a new database analysis information generation module, configured to perform an operation of generating new database analysis information based on data in the new merging data level and data in existing database analysis information in the process of generating the new merging data level.

According to the database analysis information generation system provided in this implementation of the present specification, the new merging data level generation module includes: a comparison submodule, configured to compare a primary key value in the to-be-merged data level with a primary key value in the merging data level; and a new merging data level generation submodule, configured to merge the data in the to-be-merged data level and the data in the merging data level based on a result of the comparing to generate the new merging data level in the merging process.

According to the database analysis information generation system provided in this implementation of the present specification, the new merging data level generation submodule includes: a first new merging data level generation submodule, configured to: when a primary key value in the to-be-merged data level is the same as a primary key value in the merging data level, read a row of data corresponding to the primary key value in the to-be-merged data level, and update a row of data in the merging data level that corresponds to the primary key value in the merging data level based on the row of data corresponding to the primary key value in the to-be-merged data level; and use the primary key value in the merging data level and a row of updated data corresponding to the primary key value in the merging data level as a primary key value in the new merging data level and a row of data corresponding to the primary key value in the new merging data level, where when the row of data corresponding to the primary key value in the merging data level is updated, the primary key value in the new merging data level that is the same as the primary key value in the merging data level and the row of data corresponding to the primary key value in the new merging data level are generated in the new merging data level.

According to the database analysis information generation system provided in this implementation of the present specification, the new merging data level generation submodule further includes: a second new merging data level generation submodule, configured to: when a primary key value in the to-be-merged data level is different from a primary key value in the merging data level, read a row of data corresponding to the primary key value in the to-be-merged data level, and add, to the merging data level, the primary key value in the to-be-merged data level and the row of data corresponding to the primary key value in the to-be-merged data level; and use, as a new primary key value and a row of data corresponding to the new primary key value in the new merging data level, the primary key value and the corresponding row of data that are added to the merging data level, where when the primary key value and the corresponding row of data in the to-be-merged data level are added to the merging data level, a primary key value that is the same as the primary key value in the added merging data level and a corresponding row of data are generated in the new merging data level.

According to the database analysis information generation system provided in this implementation of the present specification, the new merging data level generation submodule further includes: a third new merging data level generation submodule, configured to: when a number of columns in the row of data corresponding to the primary key value in the to-be-merged data level is greater than a number of columns in the row of data corresponding to the same primary key value in the merging data level, add, to the row of data corresponding to the primary key value in the merging data level, a column in the row of data corresponding to the primary key value in the to-be-merged data level that is different from the columns in the row of data corresponding to the same primary key value in the merging data level and data corresponding to the added columns.

According to the database analysis information generation system provided in this implementation of the present specification, the new merging data level generation submodule further includes: a fourth new merging data level generation submodule, configured to: when the merging data level includes a primary key value that is different from a primary key value in the to-be-merged data level, add, to the new merging data level, the primary key value in the merging data level that is different from the primary key value in the to-be-merged data level and a row of data corresponding to the primary key value in the merging data level that is different from the primary key value in the to-be-merged data level.

The database analysis information generation system provided in this implementation of the present specification further includes: a module for generating database analysis information for the first time, configured to: when generating database analysis information for the first time, obtain the database analysis information based on data in the merging data level that is generated for the first time, where data in the existing database analysis information is empty, and the data in the merging data level generated for the first time is directly obtained by using the data in the to-be-merged data level.

The database analysis information generation system provided in this implementation of the present specification further includes a database analysis information configuration module, configured to configure the database analysis information generated for the first time, the existing database analysis information, and the new database analysis information as database analysis information each including information on a number of rows, a column, a minimum value in a column, a maximum value in a column, and a number of different values in a column.

According to the database analysis information generation system provided in this implementation of the present specification, the new database analysis information generation module includes: a first new database analysis information generation module, configured to use a number of primary key values in the new merging data level as the number of rows in the new database analysis information based on a change of the number of primary key values in the new merging data level.

According to the database analysis information generation system provided in this implementation of the present specification, the new database analysis information generation module further includes: a second new database analysis information generation module, configured to use columns in a row of data that includes the greatest number of columns among all rows of data in the new merging data level as columns in the new database analysis information.

According to the database analysis information generation system provided in this implementation of the present specification, the new database analysis information generation module further includes: a third new database analysis information generation module, configured to: each time a primary key value and a corresponding row of data are generated in the new merging data level, compare a minimum value in a column in the new merging data level with a minimum value corresponding to the column in the existing database analysis information, and when the minimum value in the column in the new merging data level is smaller than the minimum value corresponding to the column in the existing database analysis information, select the minimum value in the column in the new merging data level as a minimum value corresponding to the column in the new database analysis information; or otherwise, select the minimum value corresponding to the column in the existing database analysis information as a minimum value corresponding to the column in the new database analysis information.

According to the database analysis information generation system provided in this implementation of the present specification, the new database analysis information generation module further includes: a fourth new database analysis information generation module, configured to: each time a primary key value and a corresponding row of data are generated in the new merging data level, compare a maximum value in a column in the new merging data level with a maximum value corresponding to the column in the existing database analysis information, and when the maximum value in the column in the new merging data level is greater than the maximum value corresponding to the column in the existing database analysis information, select the maximum value in the column in the new merging data level as a maximum value corresponding to the column in the new database analysis information; or otherwise, select the maximum value corresponding to the column in the existing database analysis information as a maximum value corresponding to the column in the new database analysis information.

According to the database analysis information generation system provided in this implementation of the present specification, the new database analysis information generation module further includes: a fifth new database analysis information generation module, configured to: each time a primary key value and a corresponding row of data are generated in the new merging data level, use a HyperLogLog algorithm to obtain a number of different values in a column in the new merging data level; and use the number of different values in the column in the new merging data level as a number of different values in the column in the new database analysis information.

The database analysis information generation system provided in this implementation of the present specification further includes a merging threshold setting module, configured to preset a data merging threshold for the to-be-merged data level, where when an amount of memory occupied by the data in the to-be-merged data level is greater than the data merging threshold, the new merging data level generation module merges the data in the to-be-merged data level and the data in the merging data level to generate the new merging data level in the merging process.

Some implementations of the present specification provides a memory, configured to store program instructions.

Some implementations of the present specification provides a processor, configured to execute the program instructions to implement the above method in the implementations of the present specification.

In comparison with the existing technologies, the at least one technical solution used in the implementations of the present specification can achieve the following beneficial effects:

In the implementations of the present specification, by using the characteristic of multi-level merging in a log-structured merge-tree (LSM tree), database analysis information is generated while data levels are merged, without a need to additionally record a modification amount of a table level, thereby reducing additional overheads of the system. When the LSM tree is used for merging, data needs to be read, and new database analysis information is generated by using data in different data levels that is read in the data level merging process, without a need to read all data in a relational table of a data block again, thereby alleviating a technical problem of consuming excessive system resources.

BRIEF DESCRIPTION OF THE SEVERAL VIEWS OF THE DRAWINGS

To describe the technical solutions in the implementations of the present specification more clearly, the following is a brief introduction of the accompanying drawings for illustrating such implementations. Clearly, the accompanying drawings described below are merely some implementations of the present specification, and a person of ordinary skill in the art can derive other drawings from such accompanying drawings without making innovative efforts.

DETAILED DESCRIPTION

To make the objectives, technical solutions, and advantages of the present application clearer, the following clearly and completely describes the technical solutions of the present application with reference to specific implementations and accompanying drawings of the present application. Clearly, the described implementations are merely some rather than all of the implementations of the present application. All other implementations obtained by a person of ordinary skill in the art based on the implementations of the present specification without making innovative efforts shall fall within the protection scope of the present application.

The technical solutions provided in one or more implementations of the present specification are described in detail below with reference to the accompanying drawings.

Figure 1:
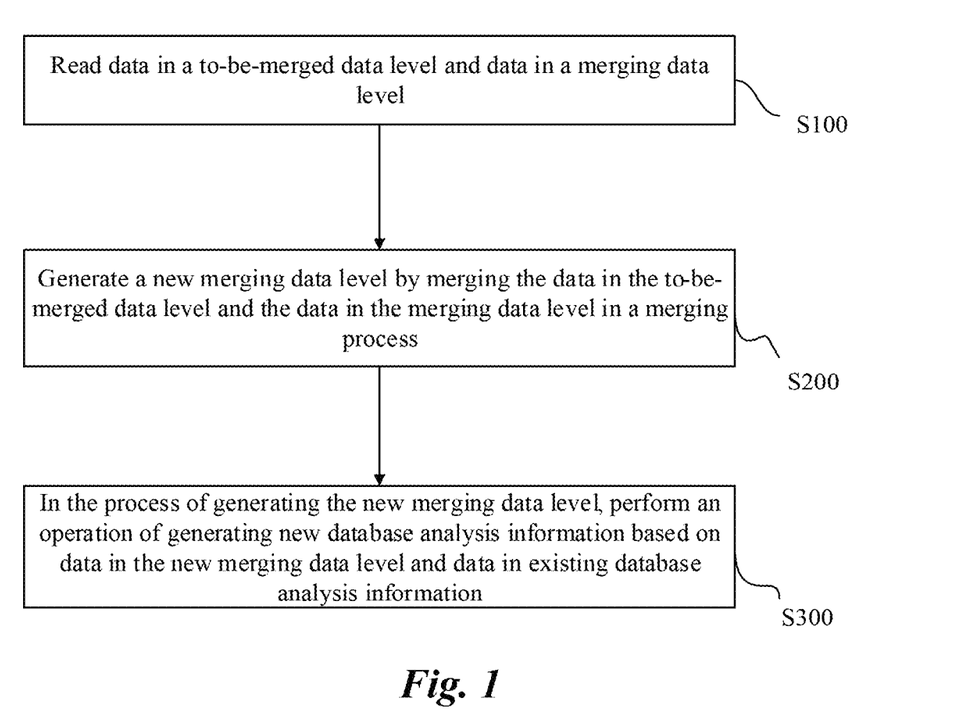
FIG. 1 is a schematic flowchart illustrating a database analysis information generation method according to some implementations of the present specification.

FIG. 1 is a schematic flowchart illustrating a database analysis information generation method according to some implementations of the present specification. The method mainly includes the following steps.

Step S100: Read data in a to-be-merged data level and data in a merging data level.

In this implementation of the present specification, data in different data levels in a relational table of a database is merged by using a log-structured merge-tree (LSM tree). All data in the database is stored in the LSM tree. The LSM tree includes multiple levels of data. A to-be-merged data level and a merging data level that need to be read are set based on an actual situation and a usage requirement, and then, data in the to-be-merged data level and the merging data level that are set is read.

The reason why the to-be-merged data level and the merging data level that need to be read in the relational table of the database are set is that database analysis information is changed greatly only when a large amount of data is modified. Therefore, the to-be-merged data level and the merging data level that need to be read are preset as required. After the to-be-merged data level and the merging data level are set, it indicates that data in the relational table of the database is modified and changed greatly after the to-be-merged data level is merged into the merging data level, and therefore, the data in the to-be-merged data level and the merging data level needs to be read to generate database analysis information.

Step S200: Generate a new merging data level by merging the data in the to-be-merged data level and the data in the merging data level in a merging process.

While the data in the to-be-merged data level and the data in the merging data level are read, the data in the to-be-merged data level and the data in the merging data level are merged to perform the operation of generating the new merging data level in the merging process, which can be as follows: The to-be-merged data level and the merging data level include the same primary key column. Each primary key value in the primary key column corresponds to one row of data. Each time a primary key value in the to-be-merged data level and a corresponding row of data and/or a primary key value in the merging data level and a corresponding row of data are read, a primary key value in the new merging data level that is the same as the primary key value in the merging data level and a row of data corresponding to the primary key value in the new merging data level are generated in the new merging data level. The new merging data level can be generated when primary key values and corresponding rows of data in the to-be-merged data level and primary key values and corresponding rows of data in the merging data level are all read. For example, the first primary key value in the to-be-merged data level and the first primary key value in the merging data level are read. If the two primary key values are the same, a row of data corresponding to the first primary key value in the to-be-merged data level is updated to a row of data corresponding to the first primary key value in the merging data level. Merging in this step is to update data in the to-be-merged data level to the merging data level, and the operation of generating the new merging data level in the merging process is to generate, each time a row of data corresponding to a primary key value is merged, the merged primary key value and a corresponding row of data in the new merging data level. For the data in the to-be-merged data level and the data in the merging data level, primary key values are sequentially compared. The primary key values are ordered in a certain way, and are read and compared according to a sequence of the primary key values. Data in the new merging data level is generated by row, i.e., is generated based on a row of data corresponding to a primary key value.

It should be emphasized that merging the data in the to-be-merged data level and the data in the merging data level to generate the new merging data level in the merging process is a high-level method, which can mean a result of merging is that the new merging data level is generated, or can mean first performing merging and then generating the new merging data level based on merged data. Only one of the methods is used as an example for description purposes in this implementation. In either method, the data in the merging data level and the data in the to-be-merged data level are read only once, the merging operation is completed based on the data read this time, and an operation of generating new database analysis information is also completed based on the data read this time.

Step S300: In the process of generating the new merging data level, perform an operation of generating new database analysis information based on data in the new merging data level and data in existing database analysis information.

After the data in the to-be-merged data level and the data in the merging data level are read, the data in the to-be-merged data level and the data in the merging data level are merged to generate some or all data in the new merging data level in the merging process, and the new merging data level can be generated after the data in the to-be-merged data level and the data in the merging data level are merged. In the process of generating the new merging data level, the new database analysis information is further generated based on the data in the new merging data level and the data in the existing database analysis information. In the process of generating the new merging data level, comparison is made with the existing database analysis information to generate the new database analysis information, and the new database analysis information is generated while the new merging data level is generated. For example, each time a primary key value and a corresponding row of data are generated in the new merging data level, data in the row that has been generated or before such a row is compared with the data in the existing database analysis information, to generate data in the new database analysis information. The data in the new database analysis information is constantly changing until the data in the new merging data level is all generated and does not change. In other words, the data in the new merging data level can change all the time before generation of the new merging data level is completed. Therefore, a result of comparing the data in the new merging data level with the existing database analysis information is also changing all the time. This process is the operation of generating the new database analysis information in the process of generating the new merging data level.

The existing database analysis information in this step is database analysis information generated last time, and when the new database analysis information is database analysis information generated for the first time, the existing database analysis information is empty.

In this implementation of the present specification, by using the characteristic of multi-level merging of the LSM tree, database analysis information is generated while data levels are merged, without a need to additionally record a modification amount of a table level, thereby reducing additional overheads of the system. When the LSM tree is used for merging, data needs to be read, and new database analysis information is generated by using data in different data levels that is read in the data level merging process, without a need to read all data in a relational table of a data block again, thereby alleviating a technical problem of consuming excessive system resources.

The above implementation describes the database analysis information generation method, alleviates the technical problem in the existing technologies, and achieves a corresponding technical effect. Some implementations of the present specification further provides a solution further optimizing the above method, which is as follows:

Before step S100, the method further includes: presetting a data merging threshold for the to-be-merged data level, where the data merging threshold is a value of a size of memory occupied by data; and when an amount of memory occupied by the data in the to-be-merged data level is greater than the data merging threshold, reading the data in the to-be-merged data level and the data in the merging data level, and merging the data in the to-be-merged data level and the data in the merging data level to generate the new merging data level. The data in the to-be-merged data level is merged into the merging data level only after a size of the memory occupied by the data in the to-be-merged data level reaches a certain value. The data merging threshold can be set based on a specific usage requirement. For example, when the size of the memory occupied by the data in the to-be-merged data level reaches one tenth of a size of memory occupied by the data in the merging data level, the data in the to-be-merged data level is merged into the merging data level.

The reading the data in the to-be-merged data level and the data in the merging data level in step S100, in some implementations, includes: first setting the to-be-merged data level and the merging data level that need to be read in the relational table of the database, and then reading the data in the to-be-merged data level and the merging data level that need to be read and have been set in the relational table of the database. In this implementation of the present specification, only the data in the to-be-merged data level and the data in the merging data level need to be read. In the LSM tree, data in a data level before the to-be-merged data level has been merged into the to-be-merged data level in this implementation, and no database analysis information needs to be generated as required when the data in the data level before the to-be-merged data level is merged into the to-be-merged data level in this implementation. The LSM tree is a hard disk-based data structure in which data is divided into multiple levels. Each level of data is ordered, and one level of data is merged into a next level of data only after a size of memory occupied by the one level of data reaches a certain value. Therefore, database analysis information of the relational table of the database can be obtained only by reading the data in the to-be-merged data level and the data in the merging data level, and there is no need to read all information of the relational table of the database.

The merging the data in the to-be-merged data level and the data in the merging data level to generate the new merging data level in the merging process in step S200 can, in some implementations, include: comparing a primary key value in the to-be-merged data level with a primary key value in the merging data level. The relational table of the database includes multiple levels of data, and the multiple levels of data are in the same relational table. Therefore, all the levels of data have the same primary key column. Because data in a previous data level of the to-be-merged data level is merged into the to-be-merged data level, primary key values included in the primary key column in different data levels may be different. The primary key value in the to-be-merged data level is compared with the primary key value in the merging data level. Each primary key value in each level of data has a unique row of data corresponding to the primary key value. Therefore, only the primary key value in the to-be-merged data level and the primary key value in the merging data level need to be compared. Information in a row of data corresponding to a primary key value can be obtained based on the primary key value.

Primary key values are set in a certain order, for example, based on magnitudes of the primary key values. Therefore, primary key values in the primary key column in the to-be-merged data level are sequentially read starting from the first primary key value in the primary key column in the to-be-merged data level, and each primary key value in the to-be-merged data level is compared with primary key values in the primary key column in the merging data level, to determine whether the primary key column in the merging data level includes a primary key value that is the same as a primary key value in the to-be-merged data level.

The merging the data in the to-be-merged data level and the data in the merging data level based on a result of comparing the primary key value in the to-be-merged data level and the primary key value in the merging data level to generate the new merging data level in the merging process can include: when a primary key value in the to-be-merged data level is the same as a primary key value in the merging data level, i.e., when the primary key column in the merging data level includes a primary key value that is the same as a primary key value in the to-be-merged data level, reading a row of data corresponding to the primary key value in the to-be-merged data level, and updating a row of data in the merging data level that corresponds to the primary key value in the merging data level based on the row of data corresponding to the primary key value in the to-be-merged data level; and using the primary key value in the merging data level and a row of updated data corresponding to the primary key value in the merging data level as a primary key value in the new merging data level and a row of data corresponding to the primary key value in the new merging data level. In other words, the primary key value and the corresponding row of data in the merged merging data level are used as the primary key value and the corresponding row of data in the new merging data level. When the row of data corresponding to the primary key value in the merging data level is updated, the primary key value that is the same as the primary key value in the merging data level and the row of data corresponding to the primary key value in the new merging data level are generated in the new merging data level. In other words, each time a row of data corresponding to the same primary key value is merged, the primary key value and the corresponding row of data are generated in the new merging data level, so that an operation of generating the row of data in the new merging data level in the merging process is completed.

The merging the data in the to-be-merged data level and the data in the merging data level based on the result of the comparing to generate the new merging data level in the merging process can further include: when a primary key value in the to-be-merged data level is different from a primary key value in the merging data level, reading a row of data corresponding to the primary key value in the to-be-merged data level, and adding, to the merging data level, the primary key value and the row of data corresponding to the primary key value in the to-be-merged data level; and using, as a new primary key value and a row of data corresponding to the new primary key value in the new merging data level, the primary key value and the corresponding row of data that are added to the merging data level. In other words, when the merging data level does not include a primary key value that is the same as a primary key value in the to-be-merged data level, the primary key value in the to-be-merged data level and a row of data corresponding to the primary key value are directly added to the merging data level to complete merging of a row of data corresponding to the primary key value. Merged data is data in the new merging data level. Alternatively or additionally, the primary key value and the corresponding row of data in the merged merging data level can be generated in the new merging data level. As such, the new merging data level includes the primary key value and the corresponding row of data, so that the operation of generating the row of data in the new merging data level is completed in the merging process. When a primary key value in the merging data level that is different from a primary key value in the to-be-merged data level and a row of data corresponding to the primary key value in the merging data level are added to the merging data level, a primary key value that is the same as the added primary key value in the merging data level and a corresponding row of data are generated in the new merging data level.

The merging the data in the to-be-merged data level and the data in the merging data level based on the result of the comparing to generate the new merging data level in the merging process further includes: when the merging data level includes a primary key value that is different from a primary key value in the to-be-merged data level, adding, to the new merging data level, the primary key value in the merging data level that is different from the primary key value in the to-be-merged data level and a row of data corresponding to the primary key value in the merging data level that is different from the primary key value in the to-be-merged data level. A result of adding is data in the new merging data level. Alternatively or additionally, the primary key value and the corresponding row of data can be generated in the new merging data level. In other words, when a number of primary key values in the to-be-merged data level is smaller than a number of primary key values in the merging data level, and some primary key values in the merging data level are excluded in the to-be-merged data level, and are included only in the merging data level, these primary key values in the merging data level and corresponding rows of data are directly stored without being changed. Because these primary key values are excluded in the to-be-merged data level, rows of data corresponding to these primary key values are not updated in the merging data level and are directly added to the new merging data level to complete the operation of generating these primary key values and the corresponding rows of data in the new merging data level in the merging process.

The merging the data in the to-be-merged data level and the data in the merging data level based on the result of the comparing to generate the new merging data level in the merging process further includes: when a number of columns in the row of data corresponding to the primary key value in the to-be-merged data level is greater than a number of columns in the row of data corresponding to the same primary key value in the merging data level, adding, to the row of data corresponding to the primary key value in the merging data level, a column in the row of data corresponding to the primary key value in the to-be-merged data level that is different from the columns in the row of data corresponding to the same primary key value in the merging data level and data corresponding to the added columns, to generate the new merging data level. For example, when a number of columns in a row of data corresponding to a primary key value in the to-be-merged data level is greater than a number of existing columns in the merging data level, a number of columns in a row of data corresponding to the primary key value in the merged merging data level is a number of columns in the row of data corresponding to the primary key value in the to-be-merged data level. In other words, all the columns in the row of data corresponding to the primary key value in the to-be-merged data level are added to the columns in the row of data corresponding to the primary key value in the merging data level. The added columns are columns excluded in the row of data corresponding to the primary key value in the merging data level. Data corresponding to columns common to the row of data corresponding to the primary key value in the two data levels is directly updated. If the above situation of adding columns to a row of data corresponding to a primary key value in the merging data level occurs for rows of data corresponding to only one or several primary key values, and no additional columns are needed for columns in rows of data corresponding to other primary key values, values in corresponding additional columns in the rows of data corresponding to the other primary key values are default values. The default values are set before columns are added.

Alternatively or additionally, the merging the data in the to-be-merged data level and the data in the merging data level based on the result of the comparing to generate the new merging data level in the merging process can be directly using the merged merging data level as the new merging data level.

Figure 2:
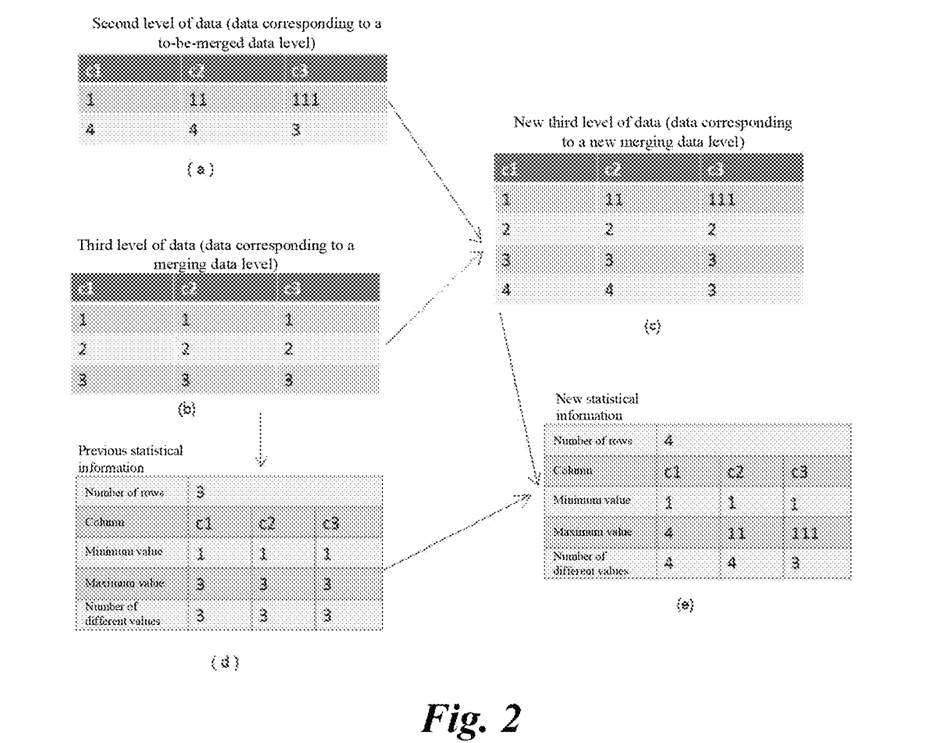
FIG. 2 is a schematic diagram illustrating generating new database analysis information according to some implementations of the present specification.

FIG. 2 is a schematic diagram illustrating generating the new database analysis information according to some implementations of the present specification. FIG. 2(a), FIG. 2(b), and FIG. 2(c) are schematic diagrams illustrating generating the new merging data level. The relational table in this implementation is a relational table of an LSM tree with three levels of data in total, and a total of three data levels are set. FIG. 2(a) shows second level of data. In this implementation, the second level of data is set as the data corresponding to the to-be-merged data level. FIG. 2(b) shows a third level of data. In this implementation, the third level of data is set as the data corresponding to the merging data level. After a size of memory occupied by the second level of data reaches a certain value, the second level of data and the third level of data are merged, and the data corresponding to the new merging data level is generated in the process of merging the second level of data and the third level of data. In this implementation, FIG. 2(c) shows data corresponding to a new third level of data, i.e., the data corresponding to the new merging data level. Because database analysis information is changed greatly only when a large amount of data is modified, there is no need to generate database analysis information while a first level of data and the second level of data are merged. Certainly, data in the first level of data has been merged or updated to the second level of data. When the second level of data and the third level of data are merged, it indicates that a large amount of information in the database has been modified, and database analysis information previously generated changes accordingly. Therefore, the new merging data level needs to be generated, and the new database analysis information needs to be generated in the process of generating the new merging data level. Therefore, the second level of data and the third level of data are used as data levels for generating the new merging data level and the new database analysis information. In other implementations, the to-be-merged data level and the merging data level can be set as required.

Data in the second level of data is merged into data in the third level of data only when a size of memory occupied by the data in the second level of data reaches a data merging threshold. The data merging threshold can be one tenth of a total memory size of the third level of data. In this implementation, column C1 in the second level of data, column C1 in the third level of data, and column C1 in the new third level of data are all used as a primary key column of the relational table, the primary key column in the second level of data includes two rows of data corresponding to primary key values 1 and 4, the primary key column in the third level of data includes three rows of data corresponding to primary key values 1, 2, and 3, and each row of data includes column C2 and column C3. The data in the second level of data and the data in the third level of data are read. When the data in the second level of data is read, primary key values in the primary key column are sequentially read. To be specific, the primary key value 1 in the second level of data is first read, and then the primary key value 4 is read. When the primary key value 1 in the second level of data is read, the primary key value 1 is compared with the primary key values in the merging data level to find that the third level of data includes a primary key value that is the same as the primary key value 1 in the second level of data. In this case, a row of data corresponding to the primary key value 1 in the second level of data is used to update a row of data corresponding to the primary key value 1 in the third level of data. A row of updated data corresponding to the primary key value 1 in the third level of data is generated in the new third level of data, and a row of data corresponding to the primary key value 1 in the new third level of data is shown in the first row in FIG. 2(c). Each time a row of data corresponding to a primary key value is updated in the data in the third level of data, this primary key value and a corresponding row of data are generated in the new third level of data, which is to generate the data in the new third level of data in the process of merging the data in the second level of data and the data in the third level of data. After updating or adding is completed for rows of data corresponding to the primary key values in the third level of data, the primary key values and the corresponding rows of data in the third level of data are generated in the new third level of data. In this implementation, only an example of one same primary key value in the second level of data and the third level of data is used, and examples of other same primary key values in two levels of data are the same as this example.

When the primary key value 4 in the second level of data is read, the primary key value 4 in the second level of data is compared with the primary key values in the third level of data to find that the third level of data does not include a primary key value that is the same as the primary key value 4 in the second level of data. In this case, the primary key value 4 and a corresponding row of data in the second level of data are added to the third level of data. Each time a row of data corresponding to the primary key value 4 is added to the third level of data, data corresponding to the primary key value 4 is also added to the third level of data. The added primary key value 4 and corresponding row of data are generated in the new third level of data, as shown in the fourth row in FIG. 2(c). Each time a primary key value and a corresponding row of data are added to the third level of data, the primary key value and the corresponding row of data are generated in the new third level of data, which is to generate the new third level of data in the process of merging the second level of data and the third level of data.

When it is found through reading that the number of columns in the row of data corresponding to the primary key value 1 in the second level of data is greater than the number of columns in the row of data corresponding to the primary key value 1 in the third level of data, additional columns in the columns in the row of data corresponding to the primary key value 1 in the second level of data apart from the columns in the row of data corresponding to the primary key value 1 in the third level of data are added to the row of data corresponding to the primary key value 1 in the third level of data. For example, if the row of data corresponding to the primary key value 1 in the second level of data includes column C4 (not shown in FIG. 2) in addition to column C2 and column C3, and a value corresponding to column C4 is 100, after the row of data corresponding to the primary key value 1 in the second level of data and the row of data corresponding to the primary key value 1 in the third level of data are merged, because the row of data corresponding to the primary key value 1 in the third level of data includes only column C2 and column C3, column C4 is added to the row of data corresponding to the primary key value 1 in the merged third level of data. A row of data corresponding to the primary key value 1 is generated in the new third level of data, and the row of data includes column C2, column C3, and column C4, and the value corresponding to column C4 is 100. If in the second level of data, the row of data corresponding to only the primary key value 1 includes more columns than the row of data corresponding to the primary key value 1 in the third level of data, and rows of data corresponding to other primary key values do not include more columns, after rows of data corresponding to the other primary key values are merged, values corresponding to additional columns are default values. The default values are set by the system. In the generated new third level of data, values of column C4 corresponding to the other primary key values are also default values. In this implementation, only the situation that a row of data corresponding to a certain primary key value includes one additional column is exemplified, and the same is true of the situation that a row of data corresponding to a certain primary key value includes multiple additional columns (the situation of additional columns is not shown in the figure).

The primary key values 2 and 3 in the third level of data are excluded in the second level of data, and the third level of data includes the primary key values 2 and 3 and corresponding rows of data that are excluded in the second level of data. In this case, the primary key values 2 and 3 and corresponding rows of data in the third level of data are directly generated in the new third level of data without being changed. Each time it is found through comparison that a primary key value is excluded in the second level of data, the primary key value and a corresponding row of data are generated in the new third level of data, which is to generate the new third level of data in the merging process. If there is an additional column, a value corresponding to the additional column is a default value, as shown in the second row and the third row in FIG. 2(c).

It should be noted that the data in the to-be-merged data level and the data in the merging data level are merged to obtain the merged merging data level, and the merged merging data level can be the new merging data level, or the new merging data level can be generated based on data in the merged merging data level.

FIG. 2(b) and FIG. 2(d) are schematic diagrams illustrating generating database analysis information for the first time according to some implementations of the present specification. The database analysis information generated for the first time is generated based on data in a merging data level generated for the first time. Data shown in FIG. 2(b) is used as the merging data level generated for the first time, and the database analysis information generated for the first time is shown in FIG. 2(d), and is generated based on the data shown in FIG. 2(b). Because the database is initially empty, and no data has been written, the database analysis information generated for the first time is generated only based on the data in the merging data level generated for the first time, and data in existing database analysis information is empty when the database analysis information is generated for the first time. The database analysis information generated for the first time is used as existing database analysis information for generating new database analysis information for the second time, and so on.

The first database analysis information, the existing database analysis information, and the new database analysis information each include information on a number of rows, a column, a minimum value in a column, a maximum value in a column, and a number of different values in a column. For example, the new database analysis information includes information on a number of primary key values, i.e., a number of rows, a column, a minimum value in a column, a maximum value in a column, and a number of different values in a column in the new merging data level.

The performing the operation of generating the new database analysis information based on the data in the new merging data level and the data in the existing database analysis information in the process of generating the new merging data level in step S300, in some implementations, includes: using a number of primary key values in the new merging data level as a number of rows in the new database analysis information based on a change of the number of primary key values in the new merging data level, where because one primary key value corresponds to one row of data, the number of primary key values is the number of rows of data in the data in the new merging data level; using columns in a row of data that includes the greatest number of columns among all rows of data in the new merging data level as columns in the new database analysis information, where statistics about columns corresponding to each row in the new merging data level are collected; each time a primary key value and a corresponding row of data are generated in the new merging data level, comparing a minimum value in a column in the new merging data level with a minimum value corresponding to the column in the existing database analysis information, and when the minimum value in the column in the new merging data level is smaller than the minimum value corresponding to the column in the existing database analysis information, selecting the minimum value corresponding to the column in the new merging data level as a minimum value corresponding to the column in the new database analysis information; or otherwise, selecting the minimum value corresponding to the column in the existing database analysis information as a minimum value corresponding to the column in the new database analysis information; each time a primary key value and a corresponding row of data are generated in the new merging data level, comparing a maximum value in a column in the new merging data level with a maximum value corresponding to the column in the existing database analysis information, and when the maximum value in the column in the new merging data level is greater than the maximum value corresponding to the column in the existing database analysis information, selecting the maximum value in the column in the new merging data level as a maximum value corresponding to the column in the new database analysis information; or otherwise, selecting the maximum value corresponding to the column in the existing database analysis information as a maximum value corresponding to the column in the new database analysis information; each time a primary key value and a corresponding row of data are generated in the new merging data level, using a HyperLogLog algorithm to obtain a number of different values in a column in a new third level of data; and using the number of different values in the column in the new third level of data as a number of different values in a column in the new database analysis information.

FIG. 2(c), FIG. 2(d), and FIG. 2(e) are a schematic diagram illustrating generating the new database analysis information. FIG. 2(d) shows the existing database analysis information, FIG. 2(c) shows the data corresponding to the new merging data level (the new third level of data in this implementation), and FIG. 2(e) shows the new database analysis information. The primary key column C1 in the new third level of data includes four primary key values, and the four primary key values correspond to four rows of data. Therefore, 4 is used as the number of rows in the new database analysis information. The new third level of data includes three columns. Therefore, the three columns are used as columns in the new database analysis information. The columns in the new third level of data are all used as the columns in the new database analysis information. A minimum value or a maximum value in a column in the new third level of data is compared with a minimum value or a maximum value corresponding to the column in the previous database analysis information. With respect to a minimum value, a smaller one in the two minimum values is used as a minimum value in the column in the new database analysis information. With respect to a maximum, a greater one in the two maximum values is used as a maximum value in the column in the new database analysis information. For example, if a minimum value and a maximum value in column C1 in the previous database analysis information is 1 and 3, and a minimum value and a maximum value in column C1 in the new third level of data is 1 and 4, a minimum value and a maximum value in column C1 in the new database analysis information is 1 and 4. The same is true of column C2 and column C3. For a number of different values in a column, a number of different values in a column in the new third level of data is obtained by using the HyperLogLog algorithm, and is used as a number of different values in the column in the new database analysis information. Because primary key values and corresponding rows of data in the new third level of data are constantly changing (e.g., added or updated), before generation of the new third level of data is completed, the data in the new database analysis information also changes with generation of each primary key value and a corresponding row of data in the third level of data. After a primary key value and a corresponding row of data are generated in the new third level of data, comparison is performed with the data in the existing database analysis information, to generate a piece of data in the new database analysis information, until the data in the new third level of data does not change any more. Data in the new database analysis information finally generated is final data in the new database analysis information.

Generation of database analysis information in this implementation of the present specification is not an independent process, and is not triggered by an SQL command, a timing task or triggered when an update amount of a table exceeds a threshold, and a modification amount of a table level does not need to be additionally recorded. Therefore, additional system overheads are avoided or reduced. New database analysis information is generated by using the characteristic that data needs to be read when the LSM tree is used for merging, without a need to read data again, thereby reducing additional system resource consumption.

Figure 3:
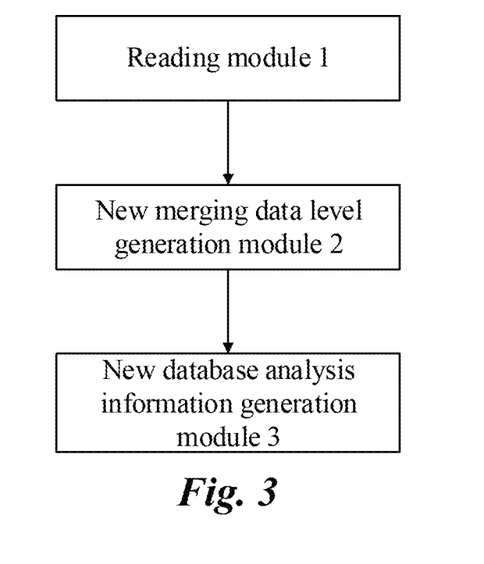
FIG. 3 is a schematic structural diagram illustrating a database analysis information generation system according to some implementations of the present specification.

According to the database analysis information generation method provided in this implementation of the present specification, database analysis information is generated. The method can be implemented by using a corresponding processing system. Some implementations of the present specification further provides a database analysis information generation system. The system includes: a reading module 1, configured to read data in a to-be-merged data level and data in a merging data level; a new merging data level generation module 2, configured to generate a new merging data level by merging the data in the to-be-merged data level and the data in the merging data level in a merging process; and a new database analysis information generation module 3, configured to perform an operation of generating new database analysis information based on data in the new merging data level and data in existing database analysis information in the process of generating the new merging data level.

The new merging data level generation module 2 includes: a comparison submodule (not shown in the figure), configured to compare a primary key value in the to-be-merged data level with a primary key value in the merging data level; and a new merging data level generation submodule (not shown in the figure), configured to merge the data in the to-be-merged data level and the data in the merging data level based on a result of the comparing to generate the new merging data level in the merging process.

The new merging data level generation submodule (not shown in the figure) includes: a first new merging data level generation submodule (not shown in the figure), configured to: when a primary key value in the to-be-merged data level is the same as a primary key value in the merging data level, read a row of data corresponding to the primary key value in the to-be-merged data level, and update a row of data in the merging data level that corresponds to the primary key value in the merging data level based on the row of data corresponding to the primary key value in the to-be-merged data level; and use the primary key value in the merging data level and a row of updated data corresponding to the primary key value in the merging data level as a primary key value in the new merging data level and a row of data corresponding to the primary key value in the new merging data level, where when the row of data corresponding to the primary key value in the merging data level is updated, the primary key value in the new merging data level that is the same as the primary key value in the merging data level and the row of data corresponding to primary key value in the new merging data level are generated in the new merging data level; a second new merging data level generation submodule (not shown in the figure), configured to: when a primary key value in the to-be-merged data level is different from a primary key value in the merging data level, read a row of data corresponding to the primary key value in the to-be-merged data level, and add, to the merging data level, the primary key value in the to-be-merged data level and the row of data corresponding to the primary key value in the to-be-merged data level; and use, as a new primary key value and a row of data corresponding to the new primary key value in the new merging data level, the primary key value and the corresponding row of data that are added to the merging data level, where when the primary key value and the corresponding row of data in the to-be-merged data level are added to the merging data level, a primary key value that is the same as the added primary key value in the merging data level and a corresponding row of data are generated in the new merging data level; a third new merging data level generation submodule (not shown in the figure), configured to: when a number of columns in the row of data corresponding to the primary key value in the to-be-merged data level is greater than a number of columns in the row of data corresponding to the same primary key value in the merging data level, add, to the row of data corresponding to the primary key value in the merging data level, a column in the row of data corresponding to the primary key value in the to-be-merged data level that is different from the columns in the row of data corresponding to the same primary key value in the merging data level and data corresponding to the added columns; and a fourth new merging data level generation submodule (not shown in the figure), configured to: when the merging data level includes a primary key value that is different from a primary key value in the to-be-merged data level, add, to the new merging data level, the primary key value in the merging data level that is different from the primary key value in the to-be-merged data level and a row of data corresponding to the primary key value in the merging data level that is different from the primary key value in the to-be-merged data level.

The system further includes a module for generating database analysis information for the first time (not shown in the figure), configured to: when generating database analysis information for the first time, obtain the database analysis information based on data in the merging data level that is generated for the first time, where data in the existing database analysis information is empty, and the data in the merging data level generated for the first time is directly obtained by using the data in the to-be-merged data level; and a database analysis information configuration module (not shown in the figure), configured to configure the database analysis information generated for the first time, the existing database analysis information, and the new database analysis information as database analysis information each including information on a number of rows, a column, a minimum value in a column, a maximum value in a column, and a number of different values in a column.

The new database analysis information generation module 3 includes: a first new database analysis information generation module (not shown in the figure), configured to use a number of primary key values in the new merging data level as the number of rows in the new database analysis information based on a change of the number of primary key values in the new merging data level; a second new database analysis information generation module (not shown in the figure), configured to use columns in a row of data that includes the greatest number of columns among all rows of data in the new merging data level as columns in the new database analysis information; a third new database analysis information generation module (not shown in the figure), configured to: each time a primary key value and a corresponding row of data are generated in the new merging data level, compare a minimum value in a column in the new merging data level with a minimum value corresponding to the column in the existing database analysis information, and when the minimum value in the column in the new merging data level is smaller than the minimum value corresponding to the column in the existing database analysis information, select the minimum value in the column in the new merging data level as a minimum value corresponding to the column in the new database analysis information; or otherwise, select the minimum value corresponding to the column in the existing database analysis information as a minimum value corresponding to the column in the new database analysis information; a fourth new database analysis information generation module (not shown in the figure), configured to: each time a primary key value and a corresponding row of data are generated in the new merging data level, compare a maximum value in a column in the new merging data level with a maximum value corresponding to the column in the existing database analysis information, and when the maximum value in the column in the new merging data level is greater than the maximum value corresponding to the column in the existing database analysis information, select the maximum value in the column in the new merging data level as a maximum value corresponding to the column in the new database analysis information; or otherwise, select the maximum value corresponding to the column in the existing database analysis information as a maximum value corresponding to the column in the new database analysis information; and a fifth new database analysis information generation module (not shown in the figure), configured to: each time a primary key value and a corresponding row of data are generated in the new merging data level, use a HyperLogLog algorithm to obtain a number of different values in a column in a new third level of data; and use the number of different values in the column in the new third level of data as a number of different values in a column in the new database analysis information. In this step, alternatively or additionally, another algorithm whose function is the same as or similar to that of the HyperLogLog algorithm can be used.

The system further includes a merging threshold setting module (not shown in the figure), configured to preset a data merging threshold for the to-be-merged data level, where when an amount of memory occupied by the data in the to-be-merged data level is greater than the data merging threshold, the new merging data level generation module merges the data in the to-be-merged data level and the data in the merging data level to generate the new merging data level in the merging process.

Some implementations of the present specification further provides an electronic device, including at least one memory and at least one processor. The memory (not shown in the figure) is configured to store program instructions, and the memory can be used for transient storage or persistent storage.

The processor (not shown in the figure) is configured to execute the program instructions to implement the database analysis information generation method in the technical solutions.

Some implementations of the present specification further provides a storage medium. The storage medium stores readable instructions, and the readable instructions can be executed by a processor to implement the database analysis information in the technical solutions.

In the 1990s, whether a technical improvement is a hardware improvement (for example, an improvement to a circuit structure, e.g., a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (e.g., a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (e.g., software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the above implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the above apparatus is described by dividing functions into various units. Certainly, when the present application is implemented, a function of each unit can be implemented in one or more pieces of software and/or hardware.

A person skilled in the art should understand that some implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPUs), an input/output interface, a network interface, and a memory.

The memory can include a non-persistent memory, a random access memory (RAM), and/or a non-volatile memory in a computer readable medium, for example, a read-only memory (ROM) or a flash memory. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It should be further noted that the terms "include", "comprise", or their any other variants are intended to cover a non-exclusive inclusion, so a process, a method, a product or a device that includes a list of elements not only includes those elements but also includes other elements which are not expressly listed, or further includes elements inherent to such a process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc., executing a specific task or implementing a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

The implementations of the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The above is merely a preferred specific implementation of one or more implementations of the specification of the present disclosure. However, the protection scope of the one or more implementations of the specification of the present disclosure is not limited thereto. Any variation or replacement readily figured out by a person skilled in the art within the technical scope disclosed in the one or more implementations of the specification of the present disclosure shall fall within the protection scope of the one or more implementations of the specification of the present disclosure. Therefore, the protection scope of the one or more implementations of the specification of the present disclosure shall be subject to the protection scope of the claims.

The various embodiments described above can be combined to provide further embodiments. Aspects of the embodiments can be modified to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
reading data in a to-be-merged data level and data in a merging data level;
generating a new merging data level by merging the data in the to-be-merged data level and the data in the merging data level in a merging process; and
generating, during the process of generating the new merging data level, new database analysis information based on data in the new merging data level and data in existing database analysis information,
wherein the generating the new merging data level includes:
comparing a primary key value in the to-be-merged data level with a primary key value in the merging data level; and
merging the data in the to-be-merged data level and the data in the merging data level based on a result of the comparing, and
wherein the merging the data in the to-be-merged data level and the data in the merging data level based on the result of the comparing includes:
in response to a primary key value in the to-be-merged data level being the same as a primary key value in the merging data level, reading a row of data corresponding to the primary key value in the to-be-merged data level, and updating a row of data in the merging data level that corresponds to the primary key value in the merging data level based on the row of data corresponding to the primary key value in the to-be-merged data level; and
using the primary key value in the merging data level and a row of updated data corresponding to the primary key value in the merging data level as a primary key value in the new merging data level and a row of data corresponding to the primary key value in the new merging data level, wherein when the row of data corresponding to the primary key value in the merging data level is updated, the primary key value in the new merging data level that is the same as the primary key value in the merging data level and the row of data corresponding to the primary key value in the new merging data level are generated in the new merging data level.

2. The method according to claim 1, wherein the merging the data in the to-be-merged data level and the data in the merging data level based on the result of the comparing to generate the new merging data level in the merging process further includes:

in response to a primary key value in the to-be-merged data level being different from a primary key value in the merging data level, reading a row of data corresponding to the primary key value in the to-be-merged data level, and adding, to the merging data level, the primary key value in the to-be-merged data level and the row of data corresponding to the primary key value in the to-be-merged data level; and using, as a new primary key value and a row of data corresponding to the new primary key value in the new merging data level, the primary key value and the corresponding row of data that are added to the merging data level, wherein when the primary key value and the corresponding row of data in the to-be-merged data level are added to the merging data level, a primary key value that is the same as the added primary key value in the merging data level and a corresponding row of data are generated in the new merging data level.

3. The method according to claim 2, comprising:

in response to a number of columns in the row of data corresponding to the primary key value in the to-be-merged data level being greater than a number of columns in the row of data corresponding to the same primary key value in the merging data level, adding, to the row of data corresponding to the primary key value in the merging data level, a column in the row of data corresponding to the primary key value in the to-be-merged data level that is different from the columns in the row of data corresponding to the same primary key value in the merging data level and data corresponding to the added column.

4. The method according to claim 3, wherein the merging the data in the to-be-merged data level and the data in the merging data level based on the result of the comparing further includes:

in response to the merging data level including a primary key value that is different from a primary key value in the to-be-merged data level, adding, to the new merging data level, the primary key value in the merging data level that is different from the primary key value in the to-be-merged data level and a row of data corresponding to the primary key value in the merging data level that is different from the primary key value in the to-be-merged data level.

5. The method according to claim 4, comprising:

in response to generating database analysis information for the first time, obtaining the database analysis information based on data in the merging data level that is generated for the first time, data in the existing database analysis information being empty, wherein the data in the merging data level generated for the first time is directly obtained by using the data in the to-be-merged data level.

6. The method according to claim 5, wherein the database analysis information generated for the first time, the existing database analysis information, and the new database analysis information each include information on a number of rows, a column, a minimum value in a column, a maximum value in a column, and a number of different values in a column.

7. The method according to claim 6, wherein the generating the new database analysis information based on the data in the new merging data level and the data in the existing database analysis information in the process of generating the new merging data level includes:

using a number of primary key values in the new merging data level as the number of rows in the new database analysis information based on a change of the number of primary key values in the new merging data level.

8. The method according to claim 7, wherein the generating the new database analysis information based on the data in the new merging data level and the data in the existing database analysis information further includes:

using columns in a row of data that includes a greatest number of columns among all rows of data in the new merging data level as columns in the new database analysis information.

9. The method according to claim 8, wherein the generating the new database analysis information based on the data in the new merging data level and the data in the existing database analysis information in the process of generating the new merging data level further includes:

each time a primary key value and a corresponding row of data are generated in the new merging data level, comparing a minimum value in a column in the new merging data level with a minimum value corresponding to the column in the existing database analysis information, and in response to the minimum value in the column in the new merging data level being smaller than the minimum value corresponding to the column in the existing database analysis information, selecting the minimum value in the column in the new merging data level as a minimum value corresponding to the column in the new database analysis information; and in response to the minimum value in the column in the new merging data level being not smaller than the minimum value corresponding to the column in the existing database analysis information, selecting the minimum value corresponding to the column in the existing database analysis information as a minimum value corresponding to the column in the new database analysis information.

10. The method according to claim 9, wherein the generating the new database analysis information based on the data in the new merging data level and the data in the existing database analysis information in the process of generating the new merging data level further includes:

each time a primary key value and a corresponding row of data are generated in the new merging data level, comparing a maximum value in a column in the new merging data level with a maximum value corresponding to the column in the existing database analysis information, and in response to the maximum value in the column in the new merging data level being greater than the maximum value corresponding to the column in the existing database analysis information, selecting the maximum value in the column in the new merging data level as a maximum value corresponding to the column in the new database analysis information; and in response to the maximum value in the column in the new merging data level being not greater than the maximum value corresponding to the column in the existing database analysis information, selecting the maximum value corresponding to the column in the existing database analysis information as a maximum value corresponding to the column in the new database analysis information.

11. The method according to claim 10, wherein the generating the new database analysis information based on the data in the new merging data level and the data in the existing database analysis information in the process of generating the new merging data level further includes:
  each time a primary key value and a corresponding row of data are generated in the new merging data level, using a HyperLogLog algorithm to obtain a number of different values in a column in the new merging data level; and
  using the number of different values in the column in the new merging data level as a number of different values in the column in the new database analysis information.

12. The method according to claim 11, before the generating the new merging data level, further comprising:
  presetting a data merging threshold for the to-be-merged data level, and in response to an amount of memory occupied by the data in the to-be-merged data level being greater than the data merging threshold, merging the data in the to-be-merged data level and the data in the merging data level.

13. A database analysis information generation system, comprising:
  a reading module, configured to read data in a to-be-merged data level and data in a merging data level;
  a new merging data level generation module, configured to generate a new merging data level by merging the data in the to-be-merged data level and the data in the merging data level in a merging process; and
  a new database analysis information generation module, configured to generate, during the process of generating the new merging data level, new database analysis information based on data in the new merging data level and data in existing database analysis information,
  wherein the new merging data level generation module includes:
    a comparison submodule, configured to compare a primary key value in the to-be-merged data level with a primary key value in the merging data level; and
    a new merging data level generation submodule, configured to merge the data in the to-be-merged data level and the data in the merging data level based on a result of the comparing, and
  wherein the new merging data level generation submodule includes:
    a first new merging data level generation submodule, configured to: in response to a primary key value in the to-be-merged data level being the same as a primary key value in the merging data level, read a row of data corresponding to the primary key value in the to-be-merged data level, and update a row of data in the merging data level that corresponds to the primary key value in the merging data level based on the row of data corresponding to the primary key value in the to-be-merged data level; and
    use the primary key value in the merging data level and a row of updated data corresponding to the primary key value in the merging data level as a primary key value in the new merging data level and a row of data corresponding to the primary key value in the new merging data level, wherein when the row of data corresponding to the primary key value in the merging data level is updated, the primary key value in the new merging data level that is the same as the primary key value in the merging data level and the row of data corresponding to the primary key value in the new merging data level are generated in the new merging data level.

14. The system according to claim 13, wherein the new merging data level generation submodule further includes:
  a second new merging data level generation submodule, configured to:
    in response to a primary key value in the to-be-merged data level being different from a primary key value in the merging data level, read a row of data corresponding to the primary key value in the to-be-merged data level, and add, to the merging data level, the primary key value in the to-be-merged data level and the row of data corresponding to the primary key value in the to-be-merged data level; and
    use, as a new primary key value and a row of data corresponding to the new primary key value in the new merging data level, the primary key value and the corresponding row of data that are added to the merging data level, wherein when the primary key value and the corresponding row of data in the to-be-merged data level are added to the merging data level, a primary key value that is the same as the added primary key value in the merging data level and a corresponding row of data are generated in the new merging data level.

15. The system according to claim 14, wherein the new merging data level generation submodule further includes:
  a third new merging data level generation submodule, configured to:
    in response to a number of columns in the row of data corresponding to the primary key value in the to-be-merged data level being greater than a number of columns in the row of data corresponding to the same primary key value in the merging data level, add, to the row of data corresponding to the primary key value in the merging data level, a column in the row of data corresponding to the primary key value in the to-be-merged data level that is different from the columns in the row of data corresponding to the same primary key value in the merging data level and data corresponding to the added columns; and
  a fourth new merging data level generation submodule, configured to: in response to the merging data level including a primary key value that is different from a primary key value in the to-be-merged data level, add, to the new merging data level, the primary key value in the merging data level that is different from the primary key value in the to-be-merged data level and a row of data corresponding to the primary key value in the merging data level that is different from the primary key value in the to-be-merged data level.

16. An electronic device, comprising:
  a memory storing executable instructions; and
  a processor, configured to execute the executable instructions to implement acts including:
    reading data in a to-be-merged data level and data in a merging data level;
    generating a new merging data level by merging the data in the to-be-merged data level and the data in the merging data level in a merging process; and
    generating, during the process of generating the new merging data level, new database analysis information based on data in the new merging data level and data in existing database analysis information,
    wherein the generating the new merging data level includes:
      comparing a primary key value in the to-be-merged data level with a primary key value in the merging data level; and merging the data in the to-be-merged data level and the data in the merging data level based on a result of the comparing, and wherein the merging the data in the to-be-merged data level and the data in the merging data level based on the result of the comparing includes:

in response to a primary key value in the to-be-merged data level being the same as a primary key value in the merging data level, reading a row of data corresponding to the primary key value in the to-be-merged data level, and updating a row of data in the merging data level that corresponds to the primary key value in the merging data level based on the row of data corresponding to the primary key value in the to-be-merged data level; and using the primary key value in the merging data level and a row of updated data corresponding to the primary key value in the merging data level as a primary key value in the new merging data level and a row of data corresponding to the primary key value in the new merging data level, wherein when the row of data corresponding to the primary key value in the merging data level is updated, the primary key value in the new merging data level that is the same as the primary key value in the merging data level and the row of data corresponding to the primary key value in the new merging data level are generated in the new merging data level.

17. The device according to claim 16 wherein the merging the data in the to-be-merged data level and the data in the merging data level based on the result of the comparing to generate the new merging data level in the merging process further includes:

in response to a primary key value in the to-be-merged data level being different from a primary key value in the merging data level, reading a row of data corresponding to the primary key value in the to-be-merged data level, and adding, to the merging data level, the primary key value in the to-be-merged data level and the row of data corresponding to the primary key value in the to-be-merged data level; and using, as a new primary key value and a row of data corresponding to the new primary key value in the new merging data level, the primary key value and the corresponding row of data that are added to the merging data level, wherein when the primary key value and the corresponding row of data in the to-be-merged data level are added to the merging data level, a primary key value that is the same as the added primary key value in the merging data level and a corresponding row of data are generated in the new merging data level.

18. The device according to claim 17 wherein the acts include:

in response to a number of columns in the row of data corresponding to the primary key value in the to-be-merged data level being greater than a number of columns in the row of data corresponding to the same primary key value in the merging data level, adding, to the row of data corresponding to the primary key value in the merging data level, a column in the row of data corresponding to the primary key value in the to-be-merged data level that is different from the columns in the row of data corresponding to the same primary key value in the merging data level and data corresponding to the added column.

19. The device according to claim 18 wherein the merging the data in the to-be-merged data level and the data in the merging data level based on the result of the comparing further includes:

in response to the merging data level including a primary key value that is different from a primary key value in the to-be-merged data level, adding, to the new merging data level, the primary key value in the merging data level that is different from the primary key value in the to-be-merged data level and a row of data corresponding to the primary key value in the merging data level that is different from the primary key value in the to-be-merged data level.

20. The device according to claim 19 wherein the acts include:

in response to generating database analysis information for the first time, obtaining the database analysis information based on data in the merging data level that is generated for the first time, data in the existing database analysis information being empty, wherein the data in the merging data level generated for the first time is directly obtained by using the data in the to-be-merged data level.

* * * * *